D. BOYLE.
Pipe-Coupling.

No. 223,835.  Patented Jan. 27, 1880.

Witnesses:  Inventor:
O. W. Bond  Daniel Boyle
W. B. Bushnell

UNITED STATES PATENT OFFICE.

DAVID BOYLE, OF CHICAGO, ILLINOIS.

PIPE-COUPLING.

SPECIFICATION forming part of Letters Patent No. 223,835, dated January 27, 1880.

Application filed February 8, 1878.

*To all whom it may concern:*

Be it known that I, DAVID BOYLE, of the city of Chicago, Cook county, State of Illinois, have invented new and useful Improvements in Pipe-Couplings, of which the following is a full description, reference being had to the accompanying drawings, in which—

Figure 1:
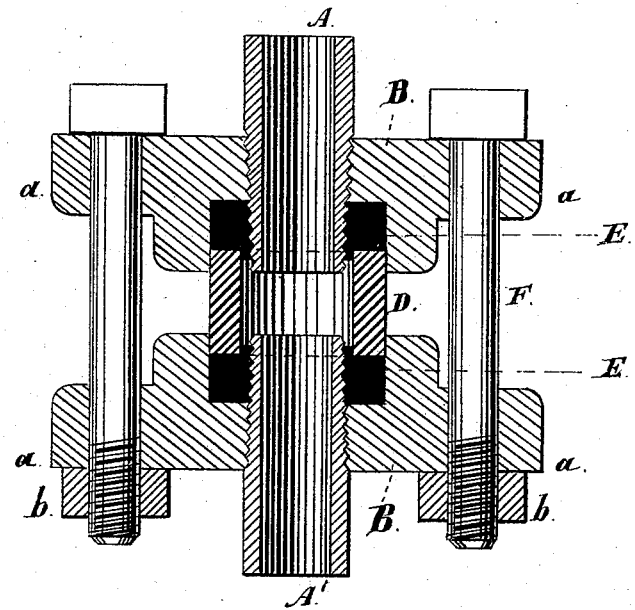
Figure 2:
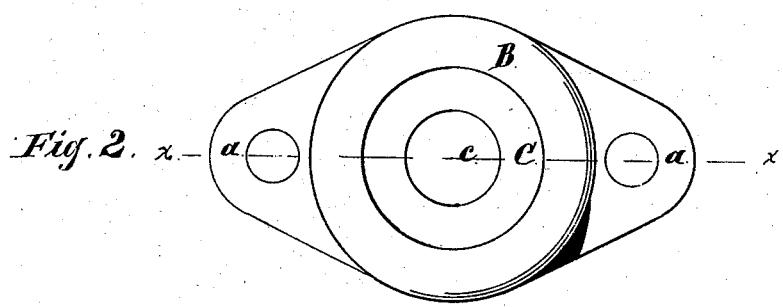
Figure 3:
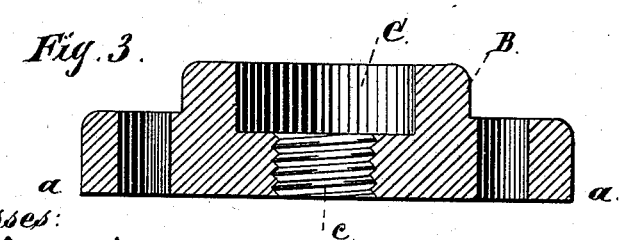

Figure 1 is a vertical longitudinal section of the complete coupling; Fig. 2, a plan view of the inner face of the stuffing-box flange; Fig. 3, a section on line $x\ x$ of Fig. 2.

The object of this invention is to construct a coupling for uniting pipes which can be rapidly and easily applied, which will be perfectly tight without the use of cement or soldering of any kind, and by the use of which sections not exactly in line can be united, and the sections taken apart whenever desired; and its nature consists in providing stuffing-box flanges having a recess or chamber and an opening to receive the end of the pipe; in filling the space between the walls of the recess and the end of the pipe with a rubber or other compressible packing in such manner that the end of the pipe will be surrounded by the packing and be embedded therein; in providing a short sleeve or cylinder so formed and arranged that when in place between the sections of pipe it will act as a double-ended gland, completing the connection, and forming a strong joint; in so arranging this gland in connection with the recesses and packing that it will compress the packing when two sections are united, making it solid and durable, and forcing the compressible packing into the space between its inner face and the end of the pipes, and also embed the packing in the screw-threads on the end of the pipe; in providing suitable means for drawing the flanges together, so that the double-ended gland will compress the packing, and in the several parts hereinafter set forth as new.

In the drawings, A A' represent two sections of pipe; B, the stuffing-box flanges; C, the recess or chamber; D, the cylinder or double-ended gland; E, the rubber or other compressible packing; F, the straining-bolts; $a$, the ears on the stuffing-box flanges; $b$, the nuts for the bolts F; $c$, the opening for the end of the pipe.

The pipes A A' are of any of the usual constructions, the ends being provided with the ordinary screw-thread.

The stuffing-box flanges B may be made from cast-iron or other suitable material, and in any form suitable for the purpose intended and the style and location of the pipe with which they are to be used. As shown, they are of a round form, and are provided on opposite sides with ears $a$.

The inner face of each stuffing-box flange is provided with a recess or chamber, C, of a depth sufficient to receive the required amount of packing, and of a size larger than the outer diameter of the pipe, so as to leave a space between the walls of the chamber or recess and the pipe for the insertion of the proper amount of packing therein and around the end of the pipe. The stuffing-box flanges are also provided with an opening, $c$, for the passage of the end of the pipe, which opening, as shown, is screw-threaded, the thread corresponding with the thread on the pipe.

The cylinder or sleeve D may be made from wrought-iron or other suitable material. The outer diameter of this cylinder or sleeve D should be the same as the diameter of the chamber or recess C, so as to fit the recess, and the size of the opening through the cylinder or sleeve D should be a little larger than the outer diameter of the pipe with which it is to be used, so as to leave a small space between the pipe and cylinder. The ends of this cylinder or sleeve D are smooth and have an even surface, so that when the cylinder or sleeve is in place it will act as a double-ended gland.

The packing E may be made from soft rubber or other flexible compressible material that can be acted upon in such manner as to be compacted and forced into the screw-thread of the pipe and between the pipe and the interior surface of the double-ended gland or cylinder D. This packing is of a width sufficient to fill the space between the walls of the chamber or recess C and the ends of the pipe, and of a thickness a little less than the depth of the chamber C, in which it is placed.

The bolts F may be of any form suitable for the purpose of binding the stuffing-box flanges together. As shown, the bolts are screw-threaded and provided with nuts b. These bolts pass through suitable openings provided for them in the ears a.

As shown, the opening c is screw-threaded; but such opening in one or both of the stuffing-box flanges might be made smooth and large enough for the flange to slip over the pipe, in which case the end of the pipe will be held firmly by the packing material when compressed, the friction of the packing when compressed being sufficient to hold the pipes together under any ordinary strain. This form of stuffing-box flange can be used where the pipes are in a position that will prevent them from being torn apart, one or both.

In the form of stuffing-box flange shown the rubber or other compressible packing E is inserted in the chamber or recess C, and the flange screwed onto the end of a pipe-section. A stuffing-box flange and its packing being provided for the end of each section to be joined, then the double-ended gland D is inserted in place between the two sections of pipe and in the chamber C, and the flanges drawn toward each other by means of the bolts F and nuts b, which compresses the packing between the ends of the gland and the bottom of the recesses or chambers, forcing it into the threads of the screw on the ends of the pipes and into the space between the pipes and the opening of the gland, thereby forming a strong joint, and one which will prevent the escape of any material passing through the pipe, the joint thus formed being as strong and impermeable as the pipe itself.

By screwing the flange-plates B to the pipe ends the pipes are firmly held by the coupling, and by projecting the ends of the pipe-sections through the flange-plates and partly onto the gland the rubber collars when compressed form a partial lock for the screw, and also a packing for the space between the pipe ends and the gland, as well as between the gland and the flanges B. The coupling can be applied to any description of pipe where a tight joint is required.

Other means than the bolts F might be used for drawing the parts together. One of the stuffing-box flanges might be provided with suitable holes, into which rods or bars secured to the other flange could pass, such rods being provided with a screw-thread to receive a nut, or with a hole for the driving of a key; or straps might be used, suitable devices being provided for operating the straps, or interlocking lugs or projections might be used on the flanges; but bolts will be found the easiest operated.

When rubber packing is used it can conveniently be made by cutting it in straight strips from one-quarter inch soft rubber of the proper width and length for the size of packing required for the pipe.

What I claim as new, and desire to secure by Letters Patent, is—

The combination of the screw-threaded stuffing-box, flanged plates B B, screw-ended pipes A A', projecting beyond the plates and packing-collars, with the packing-collars E E, double-ended gland D, and suitable connecting bolts or devices F, substantially as specified.

DAVID BOYLE.

Witnesses:
O. W. BOND,
W. B. BUSHNELL.